United States Patent [19]

Tracy

[11] Patent Number: 5,003,921

[45] Date of Patent: Apr. 2, 1991

[54] LIVE PICTURE CONSTRUCTION

[76] Inventor: Darrel C. Tracy, 8407 Dunlap #2, Anchorage, Ak. 99504

[21] Appl. No.: 486,281

[22] Filed: Feb. 28, 1990

[51] Int. Cl.$^5$ ............................................. A01K 63/00
[52] U.S. Cl. ........................................ 119/5; 40/160
[58] Field of Search ...................... 119/1, 15, 18, 29; 40/160, 161, 152.2, 547; 362/31, 32

[56] References Cited

U.S. PATENT DOCUMENTS

| | | | |
|---|---|---|---|
| 1,777,944 | 10/1930 | Trovato | 119/5 X |
| 1,969,551 | 8/1934 | Francis | 40/427 |
| 2,144,551 | 1/1939 | Skolnick | 119/5 |
| 3,276,428 | 10/1966 | Burch | 119/5 |
| 3,735,738 | 5/1973 | Lake | 119/5 |
| 4,353,327 | 10/1982 | Shroyer | 119/5 |
| 4,510,555 | 4/1985 | Mori | 362/32 |
| 4,830,899 | 5/1989 | Nakahashi | 362/32 X |

FOREIGN PATENT DOCUMENTS 2148087  5/1985  United Kingdom ................. 119/15

Primary Examiner—Gene Mancene
Assistant Examiner—R. Thomas Price
Attorney, Agent, or Firm—Leon Gilden

[57] ABSTRACT

A picture construction is provided wherein a cabinet is formed with an overlying pivotally mounted transparent glass member secured to a bottommost surface of the cabinet. The cabinet includes a series of ramps and feed troughs for storage and viewing of animals, such as gerbils and the like, therewithin. Ventilation and lighting is arranged wherein optionally selectively replaceable pictures are positionable onto a rearward face of the cabinet, wherein the pictures include fiber optic filaments therethrough, wherein an overlying illumination source directs light through the pictures and through the translucent material forming the body of the picture to enhance the visual effect of the picture in association with the animals within the cabinet.

5 Claims, 5 Drawing Sheets

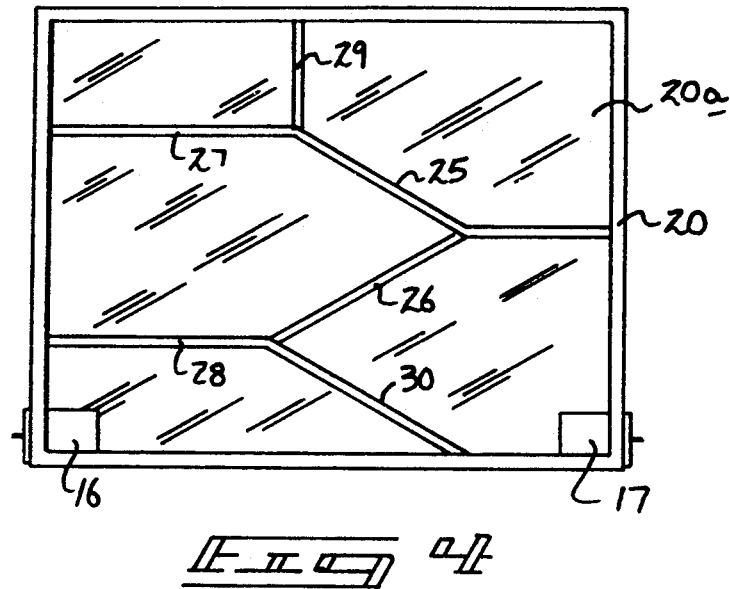
FIG 4
FIG 5
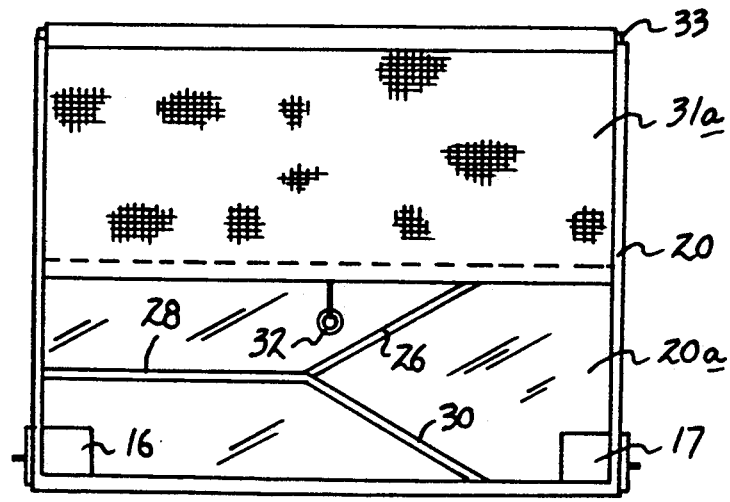

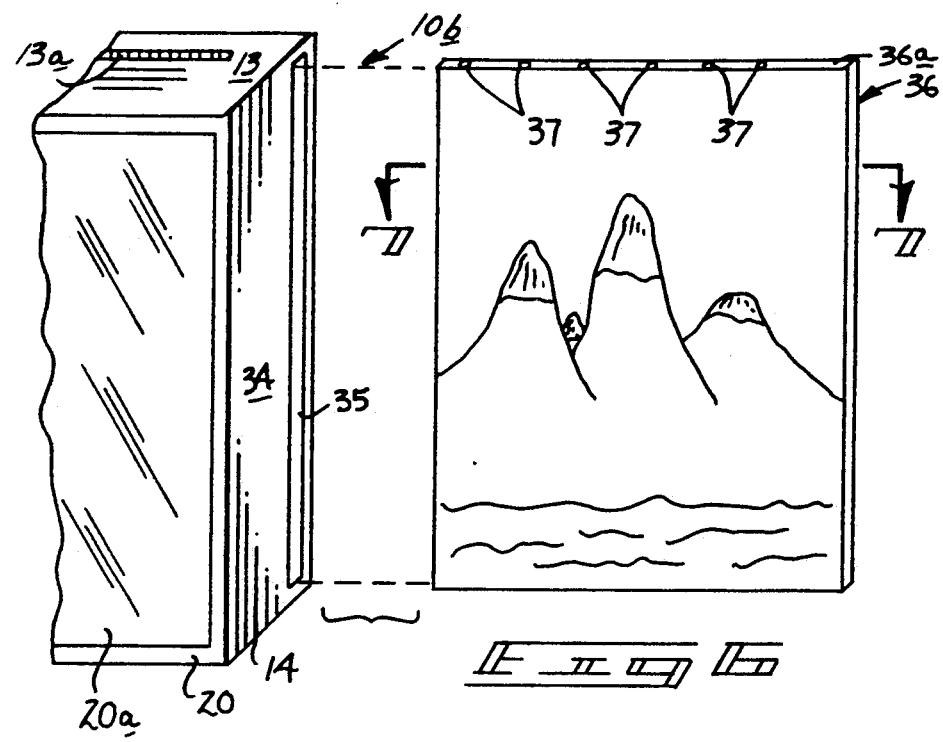
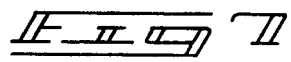
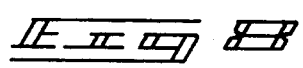
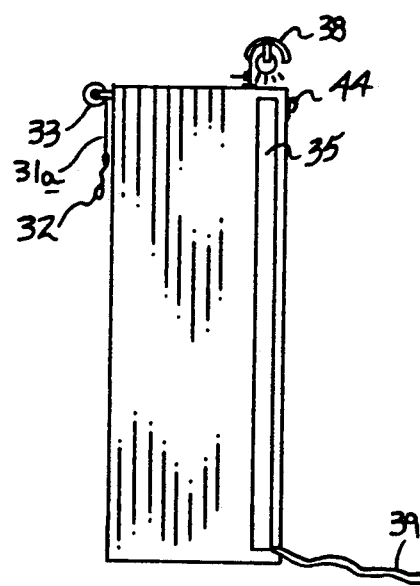

5,003,921

LIVE PICTURE CONSTRUCTION

BACKGROUND OF THE INVENTION

1. Field of the Invention

The field of the invention relates to picture organizations, and more particular pertains to a new and improved live picture construction wherein a zoo-like arrangement is provided for a wall supported construction for enhanced viewing thereof.

2. Description of the Prior Art

The use of wall supported aquariums has been utilized in the prior art to provide enhanced viewing by individuals for entertainment and soothing effect of such pictures. The prior art, however, has heretofore failed to provide an organization accommodating a more animated family of animals, such as gerbils and the like, in combination with visual effects to enhance the appearance and appeal of such a picture. Examples of the prior art include U.S. Pat. No. 4,400,905 to Brown setting forth a dual purpose picture organization wherein a picture positioned within a cabinet framework is impregnated with a pesticide to mask the purpose of the picture.

U.S. Pat. No. 3,874,336 to Murphy sets forth in aquarium mounted on a wall for securement thereto.

U.S. Pat. No. 4,353,327 to Shroyer sets forth an aquarium mounted within a three-dimensional pictorial representation for securement to a wall, including a frame and a glass-front portion.

U.S. Pat. No. 4,136,638 to Fedor provides a wall mounted aquarium with a tank for securement to the wall utilizing particular securement organization portions to receive and maintain the aquarium relative to a wall portion.

U.S. Pat. No. Des. 297,625 to Lehman provides a window greenhouse for positioning of plants therewithin.

As such, it may be appreciated that there is a continuing need for a new and improved live picture contruction as set forth by the instant invention which addresses both the problems of enhanced pictorial representations of a habitat in conjunction with mammal inhabitants secured within a cabinet organization and to this extent, the present invention substantially fulfills this need.

SUMMARY OF THE INVENTION

In view of the foregoing disadvantages inherent in the known types of dual purpose picture construction organizations now present in the prior art, the present invention provides a live picture construction wherein the same provides a zoo or cage-like construction for securement to a wall support, wherein the organization includes enhanced pictorial graphics, as well as improve the combination of mammals within the construction. As such, the general purpose of the present invention, which will be described subsequently in greater detail, is to provide a new and improved live picture construction which has all the advantages of the prior art wall supported picture organizations and none of the disadvantages.

To attain this, the live picture construction of the instant invention includes a rectangular cabinet framework including ventilation apertures directed through upper and lower wall portions of the framework with a pivotally mounted viewing glass framework mounted to the cabinet framework securable to a bottommost edge of the framework to enable access interiorly of the cabinet for cleaning thereof. The cabinet includes feeding and watering reservoirs, as well as ramp arrangements for entertainment of the mammals therewithin. Optionally, a replaceable picture organization may be included directed and received through a slot through a side wall of the cabinet, and wherein the picture is provided with fiber optic filaments directed through a translucent medium wherein an overlying illumination member directed downwardly through the cabinet illuminates and enhances viewing of the picture. An optional shade is directed forwardly of the cabinet overlying the window for quieting or masking of the inhabitants therewithin.

My invention resides not in any one of the these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent anhd Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved live picture construction which has all the advantages of the prior art live picture constructions and none of the disadvantages.

It is another object of the present invention to provide a new and improved live picture construction which may be easily and efficiently manufactured and marketed.

It is a further object of the present invention to provide a new and improved live picture construction which is of a durable and reliable construction.

An even further object of the present invention is to provide a new and improved live picture construction which includes a low cost of manufacture with regard to both materials and labor, and which accordingly results in low prices of sale to the consuming public, thereby making such live picture constructions economically available to the buying public.

Still yet another object of the present invention is to provide a new and improved live picture construction which provides in the apparatuses and methods of the prior art some of the advantages thereof, while simultaneously overcoming some of the disadvantages normally associated therewith.

Still another object of the present invention is to provide a new and improved live picture construction wherein the same provides a balance support system for containment of mammals therewithin, as well as providing enhanced visual background pictures in harmony with the mammals contained within the associated cabinetry of the instant invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawing sand descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic frontal view taken in elevation of the instant invention.

FIG. 5 is a frontal orthographic view of a modified live picture construction of the instant invention.

FIG. 6 is an isometric illustration of a yet further modified live picture construction of the instant invention.

FIG. 7 is an orthographic view taken along the lines 7—7 of FIG. 6 in the direction indicated by the arrows.

FIG. 8 is an orthographic side view taken in elevation of the yet further modified live picture construction of the instant invention.

DESCRIPTION OF THE PREFERRED EMBODIMENT

Figure 1:
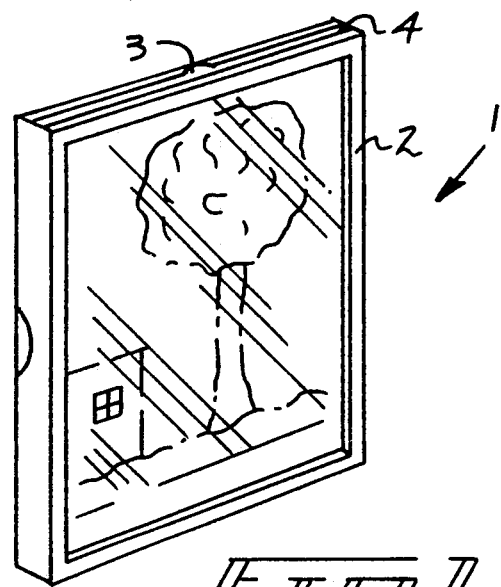
FIG. 1 is an isometric illustration of a typical prior art, dual purpose picture organization.

With reference now to the drawings, and in particular to FIGS. 1 to 10 thereof, a new and improved live picture construction embodying the principles and concepts of the present invention and generally designated by the reference numerals 10, 10a, and 10b will be described.

Figure 2:
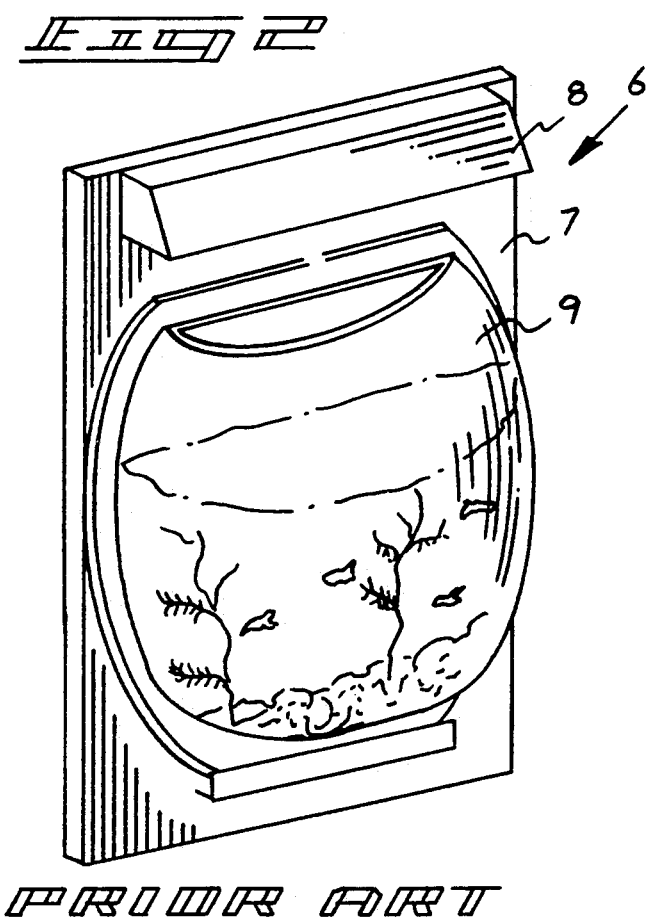
FIG. 2 is a further prior art example of a dual purpose live picture organization.
Figure 3:
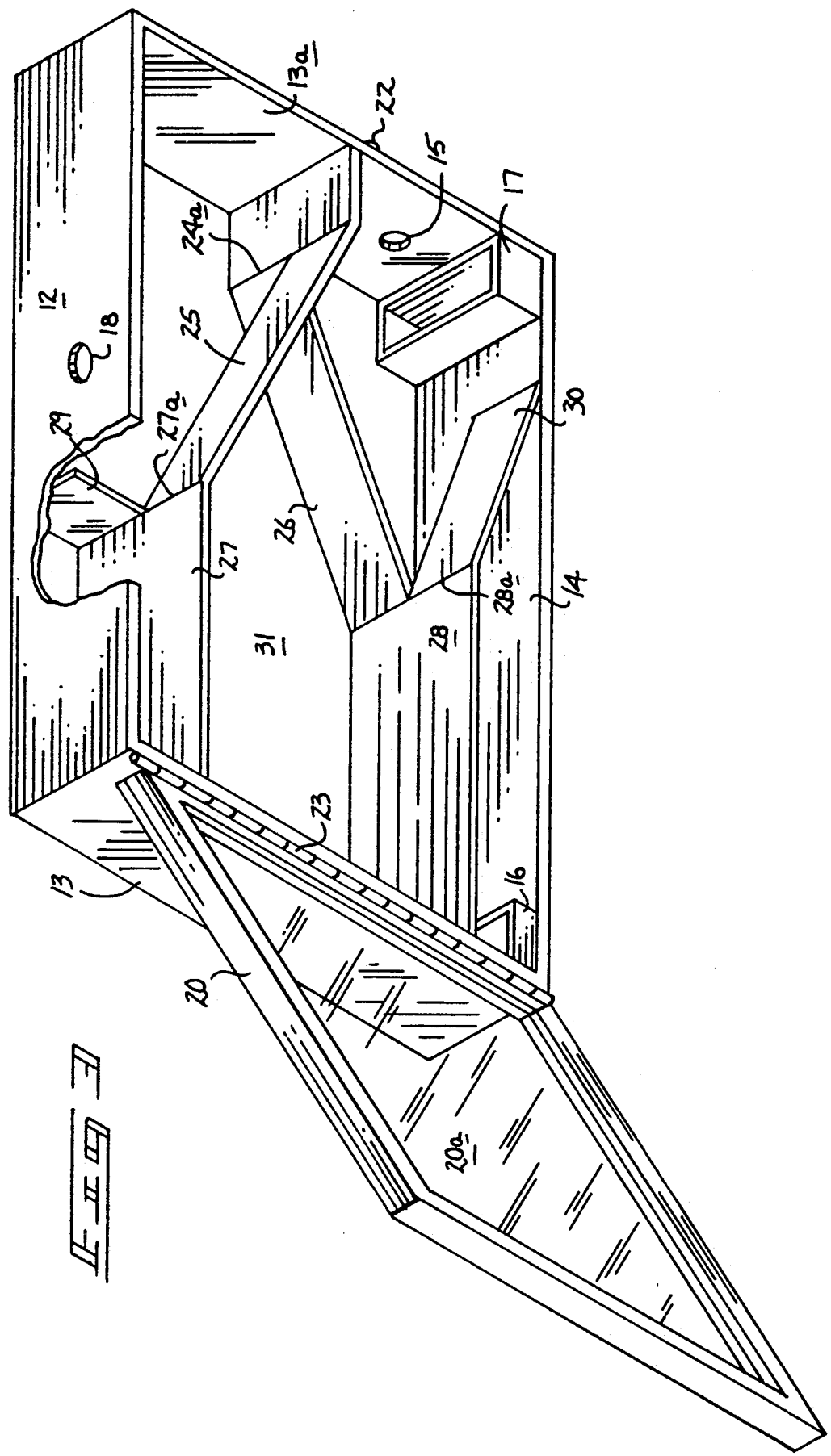
FIG. 3 is a rear isometric illustration of the instant invention.

More specifically, the live picture construction 10 of the instant invention comprises an improvement over the prior art devices, as illustrated in FIGS. 1 and 2, wherein FIG. 1 is illustrative of a dual purpose picture 1 with a framework 2 containing a slot 3 for receiving an insecticide treated picture 4 therewithin. FIG. 2 illustrates an aquarium organization 6 with a rigid baseboard 7 with an overlying light 8 and underlying aquarium portion 9.

The instant invention, including the live picture construction 10, includes a rectangular framework formed with spaced, parallel sides 13 and 13a, a top wall 12, and a bottom wall 14. A right side wall 13a includes a bottom vent aperture 15 directed therethrough. A water trough 16 and a food trough 17 are postioned at opposed ends of the bottom wall 14 adjacent interior surfaces of respective left and right side walls 13 and 13a, as illustrated top vent aperture 18 is directed through the top wall 12 for enabling direction of ventilation through the top aperture 18 and cooperating with the bottom apperture 15. A widow framework 20 of a perimeter defined by a configuration equal to that of the cabinet framework 11 overlies forward edges of the framework walls 11 and includes a hook latch 21 mounted to a bottom wall surface of the window framework 20 for cooperation with a securement loop 22 formed to a bottom surface of the bottom wall 14. A transparent window 20a is secured within the window frame 20. An elongate hinge 23 is mounted to a forward edge of the top wall 13 and cooperates with a forward edge of the left side wall of the window framework 20 to pivotally mount the window formework to the rectangular framework 11.

A right side divider wall 24 extends orthogonally and medially of an interior surface of the right side wall 13 a spaced first distance and includes an upper first joinder line 24a. A first ramp 25 and a second ramp 26 are each joined to the right side divider wall 24 at the first joinder line 24a, wherein each of the first and second ramps 25 and 26 are of a width substantially half of that of the divider wall 24 and intersecting first joinder line 24a. A first left side divider wall 27 and a second left side divider wall 28 extend orthogonally downwardly from an interior surface of the top wall 12 a distance equal to a second distance, wherein each of the first and second left side divider walls 27 and 28 terminate in second and third joinder lines 27a and 28a respectively integrally receiving and secured to top edges of the first and second ramps 25 and 26 respectively remote from their bottom edges secured to the first joinder line 24a of the right side divider wall 24. A rib 29 provides geometric integrity to the first and second ramps and is vertically oriented and joined to the seconc joinder line orthogonally to the first divider wall 27, wherein a third ramp 30 provides the structural integrity joined to the second divider wall 28 at the third joinder line 28a. The first and second ramps 25 and 26, as well as the rib 29 and the third ramp 30, are each of an equal width substantially half of that of the width defined by the right side divider wall 24 and the first and second left side divider walls 27 and 28 to enable their common joinder.

The rear wall 31 is provided with a typical wild life scene consistent with the animal to be housed within the cabinet framework 11.

FIG. 5 is illustrative of a modified live picture construction 10a wherein a spring loaded window shade 31a is mounted to a forward edge of a top wall of the window framework 20 and includes a flexible window shade with a grasp handle 32 at a bottommost edge thereof. A spring biased support roll 33 mounts to the aforenoted window framework 20 to suspend window shade 31a.

Attention to FIGS. 6, 7, and 8 illustrate a further modifed live picture construction 10b wherein an elongate slot 35 of a predetermined height is directed through a right side wall 34 of the modified live picture construction 10b, wherein the slot is aligned with a top wall slot 13a aligned with a top end surface of a picture member 36. The picture member 36 is formed of a translucent body meterial 36a with a picture imposed on a forward face thereof. A series of parallel fiber optic fibers 37 are directed coextensively through the height of the picture member 36. An illumination source 38 is mounted to the top wall 13 and overlies the aforenoted top wall slot 13a. The top wall slot is of a length substantially equal to that of the spacing of the fiber optic fibers 37 directed through the top end surface of the picture 36, as illustrated in FIGS. 6 and 7. The illumination source includes an electric cord 39 for directing power thereto.

Figure 9:
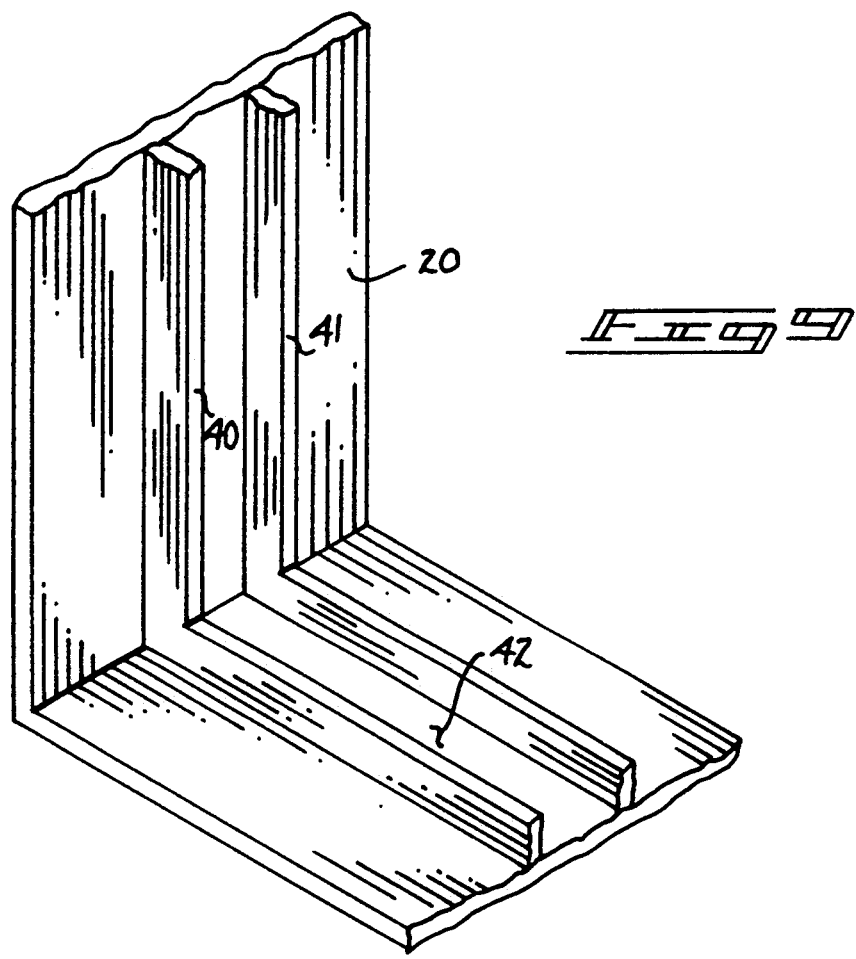
FIG. 9 is an isometric illustration of the window framework and details thereof taken partially in section.

Attention to FIG. 9 illustrates a first perimeter rib 40 parallel to and spaced from a second perimeter rib 41 defining a central gap 42 therebetween of a width to receive the transparent window 20 therewithin. The ribs 40 and 41 are formed within the window framework 20.

Figure 10:
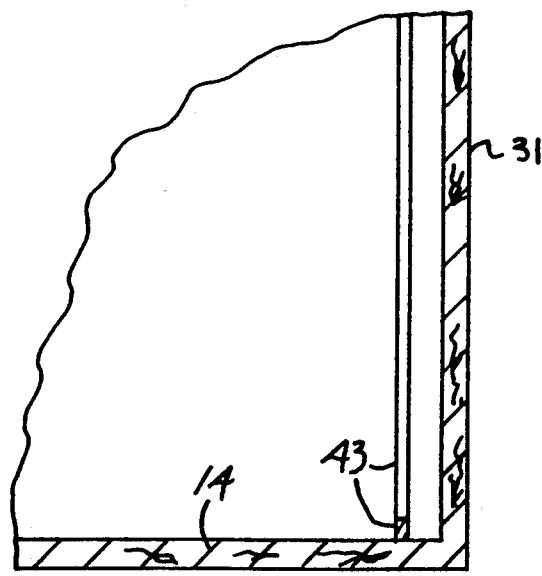
FIG. 10 is a segmented orthographic cross-sectional view of the cabinet structure of the instant invention illustrating the picture receiving framework and details thereof.

FIG. 10 illustrates an encircing securement rib 43 positioned formwardly of the rear wall 31 of the cabinet framework 11 to receive the picture member 36 therewithin. The spacing of the encircling securement rib 43 from the rear wall 31 defines a width equal to the width of the picture member 36 to properly align the picture 36 in underlying relationship relative to the top wall slot 13a, as noted above. A wall support hook 44 is mounted on a rear surface of the rear wall 31 to enable securement of the organization to an associated vertical wall support surface.

The manner of usage and operation of the instant invention should be apparent from the above disclosure to contained and provide maintenace and display of animals such as gerbils and the like within the live picture construction 10, and accorddinly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shwon and described, and accordingly, all suitable modifications and equivalents may be resorted to, falling within the scope of the invention.

What is claimed as being new and desired to be protected by Letter Patent of the United States is as follows:

1. A wall mounted picture organization for maintenance and display of live creatures therewithin, comprising in combination, a cabinet framework including spaced parallel right and left side walls, spaced parallel top and bottom walls, the walls integrally and orthogonally secured to a rear wall, and a window framwork including a transparent window mounted thereto, wherein the window framwork is of a perimeter configuration equal to a perimeter configuration defined by forward edge of the walls of the cabinet framework, and wherein the window framework is pivotally mounted at one end to a forward edge of a wall of the cabinet framework, and where in the window framework includes a latch at an opposed end relative to the one end securable to a latch receiving member mounted on an exterior surface of a wall of the cabinet framework, and a mounting member secured to a rear surface of the rear wall for securement to a vertical wall surface, and food and water trough members integrally mounted within the cabinet framwork for support and feeding of the creatures, and wherein ramp means are integrally mounted within the cabinet framework for affording exercise to the creatures therewithin, wherein the ramp means include a first divider wall medically and orthognoally mounted to an interior surface of the right wall and directed interiorly thereof terminating in a first joinder line, and a first and second ramp mounted at their right ends to the first joinder line, and secon and third divider walls orthogonally mounted to an interior surface of the left side wall terminating in respective second and third joinder lines, and the first and second ramps respectively mounted to the second and third joinder lines at left ends of the respective first and second ramps, and wherein the trough members are mounted to the bottom wall contiguous with respective opposed interior surfaces of the right and left side walls, and wherein the bottom wall includes a through-extending bottom wall vent apertures, and the top wall includes a through-extending top wall aperture for providing cooperative ventilation through the cabinet framework, and including a vertical rib mounted to the second jointer line and to an interior surface of the top wall, and a third ramp mounted to an interior surface of the bottom wall and to the third joinder line to provide geometric integrity to the ramp construction within the cabinet framework, and further including a spring biased flexible shade mounted to a forward edge of a top wall of the window framework, wherein the window shade is mounted at an upper end to a spring biased support roll and includes a grasp handle at a lowermost edge of the shade to enable selective 2. A wall mounted picture organization as set forth in claim 1 including an elongate slot of a predetermined height formed through the right side wall, and the top wall slot formed through the top wall wherein the top wall slot and the right side wall slot are aligned within a same plane parallel to the rear wall, and the right side wall slot and the top wall slot are of a predetermined width, and including a picture member of a width equal to the predetermined width and of a height equal to the predetermined height, the picture member including a translucent body member with an ornate picture formed on a forward face thereof.

3. A wall mounted picture organization as set forth in claim 2 wherein the picture member includes a series of the fiber optic members directed through the translucent body member and underlying the top wall slot.

4. A wall mounted picture organization as set forth in claim 3 including an illumination member overlying the top wall slot to direct illumination through the fiber optic members for selective illumination of the picture member.

5. A wall mounted picture organization as set forth in claim 4 wherein an encircling rib is spaced forwardly of an interior surface of the rear wall and of a width equal to the predetermined width of the picture member to align the picture members underlying the top wall slot.

* * * * *